UNITED STATES PATENT OFFICE.

CLARENCE J. BROCKBANK, OF PHILADELPHIA, PENNSYLVANIA, ASSIGNOR TO ABRASIVE COMPANY, OF PHILADELPHIA, PENNSYLVANIA, A CORPORATION OF PENNSYLVANIA.

METHOD OF MANUFACTURING ARTIFICIAL ABRASIVES FROM BAUXITE AND EMERY.

1,402,714.   Specification of Letters Patent.   Patented Jan. 3, 1922.

No Drawing.   Application filed October 21, 1920.   Serial No. 418,576.

*To all whom it may concern:*

Be it known that I, CLARENCE J. BROCKBANK, a subject of the King of Great Britain, residing in Philadelphia, county of Philadelphia, State of Pennsylvania, have invented a Method of Manufacturing Artificial Abrasives from Bauxite and Emery, of which the following is a specification.

My invention relates to improvements in the methods of producing artificial aluminous abrasives from bauxite and emery, one object of my invention being to provide a process for obtaining said artificial aluminous abrasive substantially free from compounds of titanium and iron, and a further object being to provide an abrasive of attractive color and great homogeneity which is particularly well adapted for the manufacture of stones employed for tool sharpening and similar purposes.

In the commonly employed processes of manufacturing artificial aluminous abrasives, it is customary to use as a raw material bauxite, and occasionally natural emery. The bauxite or emery is preferably first calcined to remove the combined water, and then mixed with sufficient coke or carbon to substantially reduce the iron and silicon oxides in the subsequent fusion in an electric furnace. Titanium dioxide and iron oxide can be only partially removed by this method. The prolongation of the furnace fusion or the addition to the mixture of a larger excess of coke in an endeavor to reduce the oxides of tatininum and iron results in the formation of reduction products of alumina and the rapid disintegration of the fused material on exposure to the atmosphere the material, as a consequence being quite useless as an abrasive. Treatment of the above product after crushing, with sulfuric acid or hydrochloric acid, fails to effect any improvement in the grade of the product due principally to the fact that the iron and titanium are present inclosed and uniformly distributed in the corundum crystals as amorphous threads or stringers.

I have discovered that by roasting the bauxite or emery with potassium or sodium carbonate or other alkaline compounds prior to the electrical smelting process the oxides of iron and titanium, although not reduced to any greater extent during the processing in the electrical furnace, are nevertheless segregated as a crystalline compound between the crystals of corundum, and are changed from an insoluble form to a form soluble in dilute sulfuric acid, and can, therefore, be substantially removed from the material by crushing the latter to a powder and digesting it in a solution containing sulfuric acid for such period of time as may be necessary. It is probable that the alkali combines with the silica and some alumina to form a fusible silicate in which the iron and titanium oxides dissolve at the high temperatures and from which silicate they crystallize out as soluble oxides as the temperature falls.

The following is an exact description of the process which I prefer to follow, although it will be understood that quantities, temperatures and periods of treatment may be varied to suit the various grades of bauxite used.

To a bauxite having the following composition:

| | |
|---|---|
| Silica | 4.5% |
| Iron oxide | 6.2% |
| Titanium diox | 4.0% |
| $Al_2O_3$ | 54.8% |
| $H_2O$ comb | 30.5% |
| | 100.0% |

I first add sodium or potassium carbonate in the approximate proportion of 50 lbs. to each ton of ore, the resulting mixture being then roasted in a rotary calciner to a temperature of approximately 1100° C., which is sufficient to remove the combined water. During this roasting process, the alkali combines with the metallic oxides and the silica, forming easily fusible silicates. The ore from the calciner is next mixed with sufficient coke to effect reduction of silica and iron, due allowance being made for the effect of the carbon electrodes, and the mixture fused in an electric furnace. For the above described bauxite, coke in the proportion of approximately 22 lbs. to 400 lbs. of the calcined bauxite will be found sufficient for reduction purposes.

After fusion, the pig or ingot of fused material is broken down, crushed by rolls to powder and then treated with a solution of sulfuric acid in the following manner:

The crushed grains are placed in a lead lined wooden tank or other suitable receptacle, and sufficient of a 10% solution of sulfuric acid added to completely cover the mass. Heat is applied by means of a lead steam coil, and the treatment continued for approximately 6 hours, when the material is washed and graded to different sizes of grains.

When grains prepared and treated in the aforesaid manner are mixed with ceramic bonds and vitrified in a pottery kiln, articles may be produced very pale yellow in color instead of dark brown as heretofore, more homogeneous in texture, and consequently greatly superior not only in appearance but in cutting and grinding qualities.

Although it is preferred to employ the carbonates of potassium and sodium as the alkaline materials on the grounds of availability and cheapness, it will be understood that the chlorides, sulfates and oxides of these metals may be used with equal success. Nor is the solvent to be limited to sulfuric acid since others, such as hydrochloric and nitric, will answer the purpose equally well.

I claim:

1. The method of manufacturing an artificial aluminous abrasive, which comprises roasting an aluminous ore with a substance capable of combining with the metallic oxides constituting impurities of said ore, and of effecting in a subsequent fusing process the segregation of said oxides in the form of easily soluble compounds.

2. The method of manufacturing an artificial aluminous abrasive, which comprises roasting an aluminous ore with a substance capable of combining with the metallic oxides constituting impurities of said ore, and of effecting in a subsequent fusing process the segregation of said oxides in the form of easily soluble compounds, and treating said fused product with a dilute acid to dissolve said compounds.

3. The process of manufacturing an artificial aluminous abrasive, which comprises roasting an aluminous ore with an alkali, fusing said resulting product, and treating the fused product with an acid, substantially as and for the purpose set forth.

4. The process of manufacturing an artificial aluminous abrasive, which comprises roasting bauxite with an alkali, fusing the said resulting product, and treating the fused product with an acid, substantially as and for the purpose set forth.

5. The process of manufacturing an artificial aluminous abrasive, which comprises roasting an aluminous ore with sodium carbonate, fusing said resulting product, and treating the fused product with an acid, substantially as and for the purpose set forth.

6. The process of manufacturing an artificial aluminous abrasive, which comprises roasting an aluminous ore with an alkali to a temperature of approximately 1100° C., fusing said product with a reducing agent, and treating the fused product with an acid, substantially as and for the purpose set forth.

7. The process of manufacturing an artificial aluminous abrasive, which comprises roasting bauxite with an alkali to a temperature of approximately 1100° C., fusing said product with a reducing agent, and treating the fused product with dilute sulfuric acid, substantially as and for the purpose set forth.

CLARENCE J. BROCKBANK.